United States Patent
Mitani et al.

(10) Patent No.: US 9,752,529 B2
(45) Date of Patent: Sep. 5, 2017

(54) CONTROL APPARATUS AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Shinichi Mitani, Susono (JP); Daisuke Uchida, Gotenba (JP); Naoya Kaneko, Gotenba (JP); Kenji Hoshi, Gotenba (JP); Hiroaki Adachi, Kanagawa-ken (JP); Susumu Hashimoto, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/915,348

(22) PCT Filed: Aug. 28, 2014

(86) PCT No.: PCT/IB2014/001630
§ 371 (c)(1),
(2) Date: Feb. 29, 2016

(87) PCT Pub. No.: WO2015/028873
PCT Pub. Date: Mar. 5, 2015

(65) Prior Publication Data
US 2016/0215724 A1  Jul. 28, 2016

(30) Foreign Application Priority Data

Sep. 2, 2013 (JP) ................................ 2013-181432

(51) Int. Cl.
*F02D 41/40* (2006.01)
*F02D 41/30* (2006.01)
(Continued)

(52) U.S. Cl.
CPC ....... *F02D 41/3005* (2013.01); *F02D 41/402* (2013.01); *F02M 51/06* (2013.01); *F02M 61/04* (2013.01); *Y02T 10/44* (2013.01)

(58) Field of Classification Search
CPC .. F02D 41/3005; F02D 41/402; F02D 41/247; F02D 41/40; F02D 41/34;
(Continued)

(56) References Cited

U.S. PATENT DOCUMENTS

| 9,371,790 | B2 * | 6/2016 | Ruona ................... F02D 35/024 |
| 2006/0180122 | A1 | 8/2006 | Maekawa et al. |
| 2014/0007841 | A1 | 1/2014 | Kawai |

FOREIGN PATENT DOCUMENTS

| DE | 10240476 A1 | 3/2003 |
| DE | 102007000323 A1 | 12/2007 |

(Continued)

*Primary Examiner* — Hai Huynh
(74) *Attorney, Agent, or Firm* — Andrews Kurth Kenyon LLP

(57) ABSTRACT

A control apparatus for an internal combustion engine, wherein the internal combustion engine includes a fuel injection valve injecting fuel directly into a cylinder. The control apparatus includes an ECU. The ECU is configured to execute a divided injection control to inject fuel from the fuel injection valve by a plurality of partial lift injections. The ECU is configured to execute a division number reduction control when the value of a spray shape parameter representing spray shape fluctuation is greater than a division number reduction determination value. The division number reduction control is control to reduce the number of partial lift injections in one engine cycle and to lengthen an injection time of each of the partial lift injections.

10 Claims, 17 Drawing Sheets

(51) Int. Cl.
*F02M 51/06* (2006.01)
*F02M 61/04* (2006.01)

(58) Field of Classification Search
CPC ..... F02D 41/345; F02D 41/401; F02M 61/04;
F02M 51/06; Y02T 10/44
USPC .......................... 123/299, 300; 701/103–105
See application file for complete search history.

(56) References Cited

FOREIGN PATENT DOCUMENTS

| | | |
|---|---|---|
| JP | 2003-021024 | 1/2003 |
| JP | 2006-220098 A | 8/2006 |
| JP | 2008-196387 A | 8/2008 |
| WO | 2012/127622 A1 | 9/2012 |

* cited by examiner

CONTROL APPARATUS AND CONTROL METHOD FOR INTERNAL COMBUSTION ENGINE

CROSS-REFERENCE TO RELATED APPLICATIONS

This is a national phase application based on the PCT International Patent Application No. PCT/IB2014/001630 filed Aug. 28, 2014, claiming priority to Japanese Patent Application No. 2013-181432 filed Sep. 2, 2013, the entire contents of both of which are incorporated herein by reference.

BACKGROUND OF THE INVENTION

1. Field of the Invention

This invention relates to a control apparatus and a control method for an internal combustion engine.

2. Description of Related Art

Japanese Patent Application Publication No. 2003-21024 (JP 2003-21024 A) discloses the implementation of a plurality of partial lift injections for lifting a needle valve by a smaller amount than a full lift amount.

SUMMARY OF THE INVENTION

The partial lift injection is an injection which starts closing of the needle valve before the needle lift amount reaches the full lift amount. Therefore, in the partial lift injection, there is a possibility of greater fluctuation in the needle lift amount, compared to full lift injection. This fluctuation is represented as a fluctuation in the shape of the spray in each of the respective partial lift injections. When fluctuation in the shape of the spray occurs, the properties of the exhaust gas discharged from the combustion chamber of the internal combustion engine deteriorate, and drivability becomes worse.

This relates to a case where divided injection control is implemented, in which a partial lift injection is executed a plurality of times during one engine cycle.

This invention provides a fuel injection control apparatus and a control method for an internal combustion engine which suppresses deterioration of the combustion properties and drivability, in cases where divided injection control is executed.

In a control apparatus for an internal combustion engine relating to a first aspect of this invention, the internal combustion engine includes a fuel injection valve that injects fuels directly into a cylinder. The control apparatus includes an electronic control unit (ECU). The ECU is configured to execute a divided injection control to inject fuel from a fuel injection valve by a plurality of partial lift injections. The ECU is configured to execute a division number reduction control when the value of a spray shape parameter representing spray shape fluctuation is greater than a division number reduction determination value. The division number reduction control is control to reduce the number of partial lift injections in one engine cycle and to lengthen an injection time of each of the partial lift injections.

According to the control apparatus relating to the first aspect of this invention, it is possible to suppress deterioration of the exhaust gas properties and the drivability. More specifically, the amount of fuel injected by one partial lift injection is very small indeed. Consequently, when divided injection control is carried out, there is an advantage in that the particularization of the fuel injected from the fuel injection valve is promoted. However, although this advantage is obtained by execution of divided injection control, the needle lift amount in one partial lift injection is very small indeed, and therefore fluctuation occurs in the needle lift amount of each partial lift injection, and in accordance with this, there is a possibility of increase in the fluctuation of the spray shape. When the fluctuation of the spray shape is large, then there is also a possibility of deterioration in the exhaust properties or the drivability.

Here, according to the control apparatus relating to the first aspect of this invention, when there is large fluctuation in the spray shape (in other words, when the spray shape parameter is greater than the division number reduction determination value), then the number of divisions is reduced, and in accordance with this, the injection time of each partial lift injection is lengthened. Thereby, the needle lift amount in one partial lift injection becomes greater, and the fluctuation in the spray shape becomes smaller. Consequently, it is possible to suppress deterioration of the exhaust gas properties and the drivability.

In the control apparatus relating to the first aspect of this invention, the ECU may prohibit the execution of the divided injection control, when the value of the spray shape parameter after execution of the division number reduction control is greater than the division number reduction determination value. According to this, when fluctuation in the spray shape has not been eliminated (in other words, when the value of the spray shape parameter is greater than the division number reduction determination value), despite having reduced the number of divisions, then the execution of divided injection is prohibited and thereafter normal injection is executed. Consequently, it is possible to more reliably suppress deterioration of the exhaust gas properties and the drivability.

In the control apparatus relating to the first aspect of this invention, the internal combustion engine may be provided with a plurality of cylinders. The ECU may execute a division number compensation control when the execution of the divided injection control is prohibited for one cylinder. The division number compensation control may be control for increasing the number of partial lift injections in one engine cycle and shortening the injection time of each partial lift injection, in at least one of the remaining cylinders. As described above, divided injection exhibits an advantage in that the particularization of the fuel injected from the fuel injection valve is thereby promoted. Consequently, when execution of divided injection is prohibited in any one cylinder, then no advantage is obtained from the divided injection in relation to this cylinder. However, when the number of partial injections in one engine cycle is increased in at least one of the remaining cylinders, then it is possible to maintain the advantage gained from divided injection in the internal combustion engine as a whole.

In the control apparatus relating to the first aspect of this invention, the internal combustion engine may be provided with a plurality of cylinders. The ECU may execute the division number compensation control when the division number injection control is executed for one cylinder. The division number compensation control may be control for increasing the number of partial lift injections in one engine cycle and shortening the injection time of each of the partial lift injections, in at least one of the remaining cylinders. As described above, divided injection exhibits an advantage in that the particularization of the fuel injected from the fuel injection valve is thereby promoted. Therefore, when the number of divisions is reduced in any one cylinder (in other words, division number reduction control is executed), the advantage gained from divided injection is reduced in respect of that cylinder. However, when the number of partial injections in one engine cycle is increased in at least one of the remaining cylinders, then it is possible to maintain the advantage gained from divided injection in the internal combustion engine as a whole.

In the control apparatus relating to the first aspect of this invention, the ECU may execute a division number increase control, when the value of the spray shape parameter is smaller than the division number reduction determination value. The division number reduction control may be control to increase the number of partial lift injections in one engine cycle and to shorten an injection time of each of the partial lift injections. According to this, the number of divisions is increased when there is a possibility of the fluctuation of the spray shape coming within a tolerable range (in other words, of the spray shape parameter being kept at or below the division number reduction determination value), even if the number of divisions is increased. Therefore, it is possible to gain the advantage of divided injection more effectively.

In the control method for an internal combustion engine relating to a second aspect of this invention, the internal combustion engine includes a fuel injection valve that injects fuels directly into a cylinder, and an ECU. The control method includes: executing, by the ECU, divided injection control to inject fuel from the fuel injection valve by a plurality of partial lift injections; and executing, by the ECU, a division number reduction control by the ECU, when the value of a spray shape parameter representing spray shape fluctuation is greater than a division number reduction determination value. The division number reduction control is control to reduce the number of partial lift injections in one engine cycle and to lengthen an injection time of each of the partial lift injections.

According to the control method relating to the second aspect of this invention, it is possible to suppress deterioration of the exhaust gas properties and the drivability. In other words, the amount of fuel injected by one partial lift injection is very small indeed. Consequently, when divided injection control is carried out, there is an advantage in that the particularization of the fuel injected from the fuel injection valve is promoted. However, although this advantage is obtained by execution of divided injection control, the needle lift amount in one partial lift injection is very small indeed, and therefore fluctuation occurs in the needle lift amount of each partial lift injection, and in accordance with this, there is a possibility of increase in the fluctuation of the spray shape. When the fluctuation of the spray shape is large, then there is also a possibility of deterioration in the exhaust properties or the drivability.

Here, according to the control method relating to the second aspect of this invention, when there is large fluctuation in the spray shape (in other words, when the spray shape parameter is greater than the division number reduction determination value), then the number of divisions is reduced, and in accordance with this, the injection time of each partial lift injection is lengthened. Thereby, the needle lift amount in one partial lift injection becomes greater, and the fluctuation in the spray shape becomes smaller. Consequently, it is possible to suppress deterioration of the exhaust gas properties and the drivability.

In the control method relating to the second aspect of this invention, execution of the divided injection control may be prohibited by the ECU, when the value of the spray shape parameter after execution of the division number reduction control is greater than the division number reduction determination value. According to this, when fluctuation in the spray shape has not been eliminated (in other words, when the value of the spray shape parameter is greater than the division number reduction determination value), despite having reduced the number of divisions, then the execution of divided injection is prohibited and thereafter normal injection is executed. Consequently, it is possible to more reliably suppress deterioration of the exhaust gas properties and the drivability.

In the control method relating to the second aspect of this invention, the internal combustion engine may be provided with a plurality of cylinders. A division number compensation control may be executed by the ECU, when the execution of the divided injection control is prohibited for one cylinder. The division number compensation control may be control for increasing the number of partial lift injections in one engine cycle and shortening the injection time of each of the partial lift injections, in at least one of the remaining cylinders. As described above, divided injection exhibits an advantage in that the particularization of the fuel injected from the fuel injection valve is thereby promoted. Consequently, if execution of divided injection is prohibited in any one cylinder, then no advantage is obtained from the divided injection in relation to this cylinder. However, when the number of partial injections in one engine cycle is increased in at least one of the remaining cylinders, then it is possible to maintain the advantage gained from divided injection in the internal combustion engine as a whole.

In the control method relating to the second aspect of this invention, the internal combustion engine may be provided with a plurality of cylinders. The division number compensation control may be executed by the ECU, when the division number reduction control is executed for one cylinder. The division number compensation control may be control for increasing the number of partial lift injections in one engine cycle and shortening the injection time of each of the partial lift injections, in at least one of the remaining cylinders. As described above, divided injection exhibits an advantage in that the particularization of the fuel injected from the fuel injection valve is thereby promoted. Therefore, when the number of divisions is reduced in any one cylinder (in other words, division number reduction control is executed), then the advantage gained from divided injection is reduced in respect of that cylinder. However, when the number of partial injections in one engine cycle is increased in at least one of the remaining cylinders, then it is possible to maintain the advantage gained from divided injection in the internal combustion engine as a whole.

In the control method relating to a second aspect of this invention, a division number increase control may be executed by the ECU, when the value of the spray shape parameter is smaller than the division number reduction determination value. The division number reduction control may be control to increase the number of partial lift injections in one engine cycle and to shorten an injection time of each of the partial lift injections. According to this, the number of divisions is increased when there is a possibility of the fluctuation of the spray shape coming within a tolerable range (in other words, of the spray shape parameter being kept at or below the division number reduction determination value), even if the number of divisions is increased. Therefore, it is possible to gain the advantage of divided injection more effectively.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
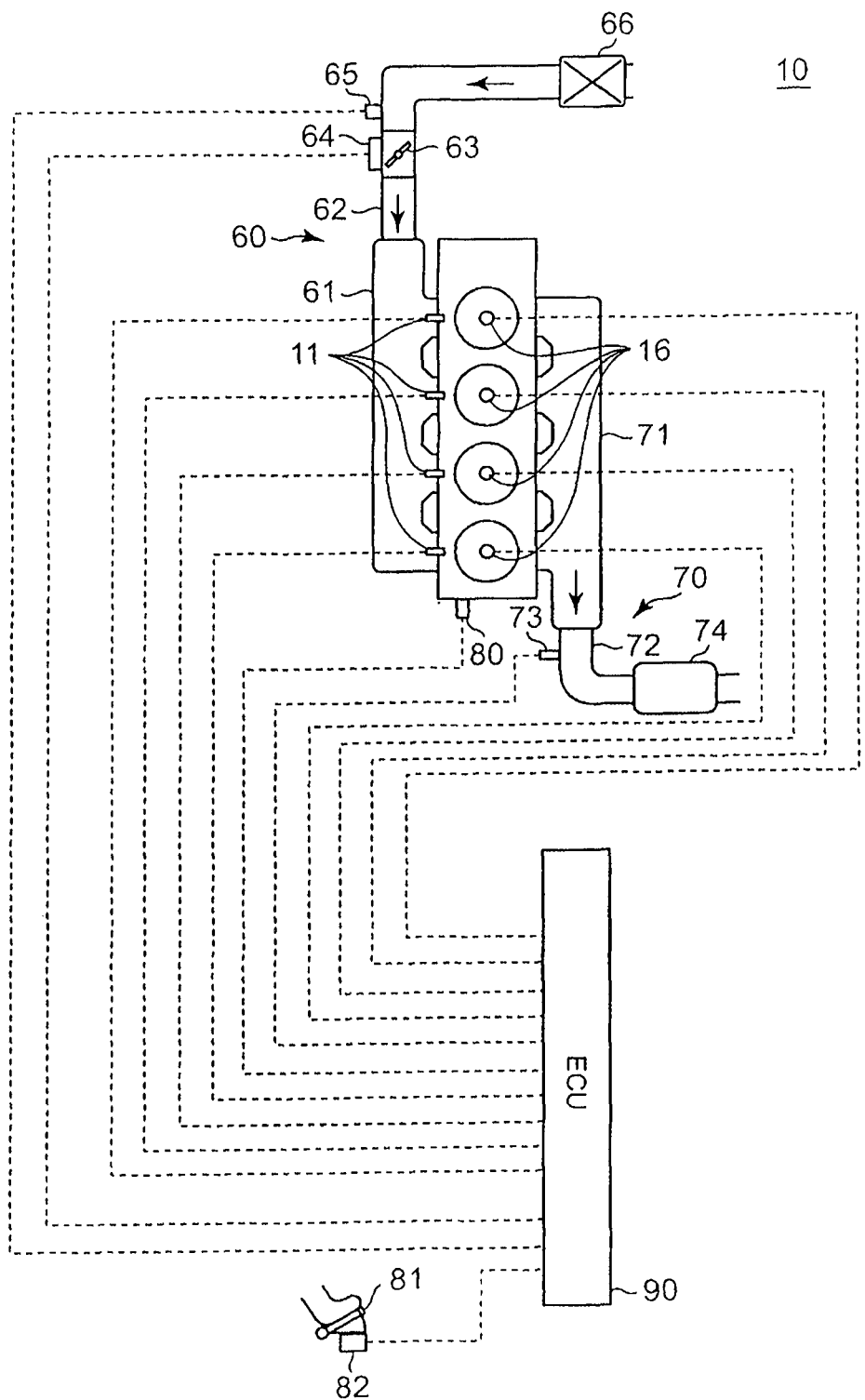
FIG. 1 shows an internal combustion engine to which the fuel injection control apparatus according to an embodiment of this invention is applied.
Figure 2:
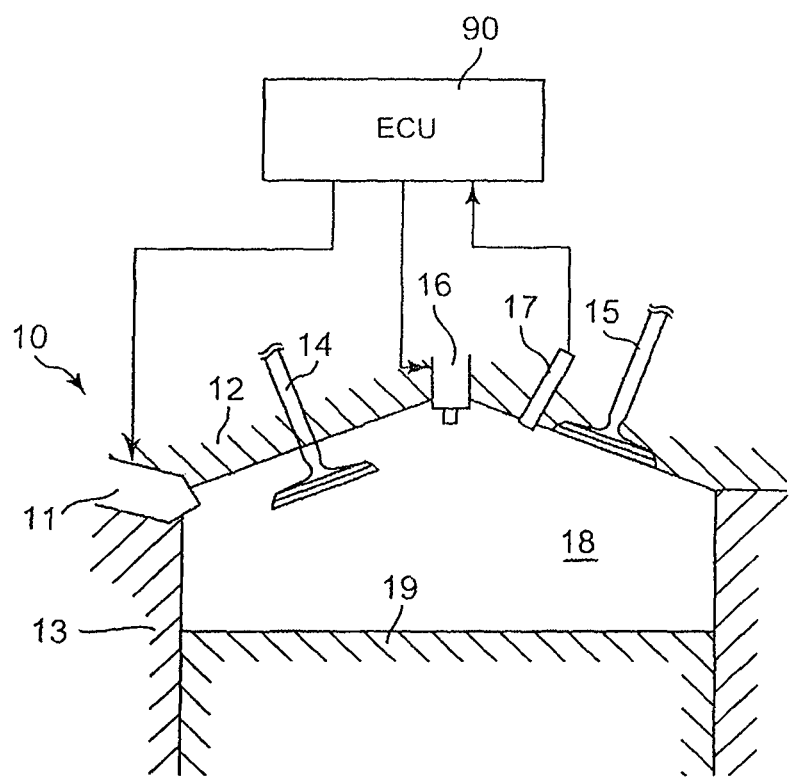
FIG. 2 shows a longitudinal cross-section of the internal combustion engine in FIG. 1.

Below, a first embodiment of this invention is described below with reference to the drawings. The internal combustion engine to which the combustion fuel control apparatus according to this invention can be applied is shown in FIGS. 1 and 2. In FIGS. 1 and 2, numeral 10 represents a main body of the internal combustion engine ("engine main body" below), numeral 11 represents a fuel injection valve, numeral 12 represents a cylinder head, numeral 13 represents a cylinder block, numeral 14 represents an intake valve, numeral 15 represents an exhaust valve, numeral 16 represents an ignition plug, numeral 17 represents a cylinder internal pressure sensor, numeral 18 represents a combustion chamber, numeral 19 represents a piston, numeral 60 represents an air intake passage, numeral 61 represents an air intake manifold, numeral 62 represents an air intake pipe, numeral 63 represents a throttle valve, numeral 64 represents a throttle valve actuator, numeral 65 represents an air flow meter, numeral 66 represents an air filter, numeral 70 represents an exhaust passage, numeral 71 represents an exhaust manifold, numeral 72 represents an exhaust pipe, numeral 73 represents an air/fuel ratio sensor, numeral 74 represents an exhaust gas control catalyst, numeral 80 represents a crank position sensor, numeral 81 represents an accelerator pedal, numeral 82 represents an accelerator pedal depression amount sensor, and numeral 90 represents an ECU.

The fuel injection valve 11 is installed in a portion of the engine main body 10 on the side of the exhaust valve 14 (for example, the portion of the cylinder head 12 or the portion of the cylinder block 13) in the upper portion of the inside of the cylinder (in other words, in the combustion chamber 18).

The fuel injection valve 11, the spark plug 16 and the throttle valve actuator 64 are connected electrically to the ECU 90. The ECU 90 supplies a control signal for controlling the operation of the fuel injection valve 11, to the fuel injection valve 11. Furthermore, the ECU 90 supplies a control signal for controlling the operation of the spark plug 16, to the spark plug 16. Furthermore, the ECU 90 supplies a control signal for controlling the operation of the throttle valve actuator 64, to the throttle valve actuator 64.

Moreover, the cylinder internal pressure sensor 17, the air flow meter 65, the air/fuel ratio sensor 73, the crank position sensor 80 and the accelerator pedal depression amount sensor 82 are electrically connected to the ECU 90. The cylinder internal pressure sensor 17 outputs a signal corresponding to the cylinder internal pressure (in other words, the pressure inside the cylinder), and this signal is input to the ECU 90. The ECU 90 calculates the cylinder internal pressure on the basis of this signal. The air flow meter 65 outputs a signal corresponding to the amount of air passing therethrough, and this signal is input to the ECU 90. The ECU 90 calculates the intake air amount (in other words, the amount of air taken into the combustion chamber 18) on the basis of this signal. The air/fuel ratio sensor 73 outputs a signal corresponding to the oxygen concentration in the exhaust gas arriving at same, and this signal is input to the ECU 90. The ECU 90 calculates the air/fuel ratio of the exhaust gas (in other words, the air/fuel ratio of the air mixture formed inside the combustion chamber 18), on the basis of this signal. The crank position sensor 80 outputs a signal corresponding to the phase of the crank shaft (not illustrated), and this signal is input to the ECU 90. The ECU 90 calculates the engine revolutions on the basis of this signal. The accelerator pedal depression amount sensor 82 outputs a signal corresponding to the depression amount of the accelerator pedal 81, and this signal is input to the ECU 90. The ECU 90 calculates the required load (in other words, engine load) on the basis of this signal.

Figure 3:
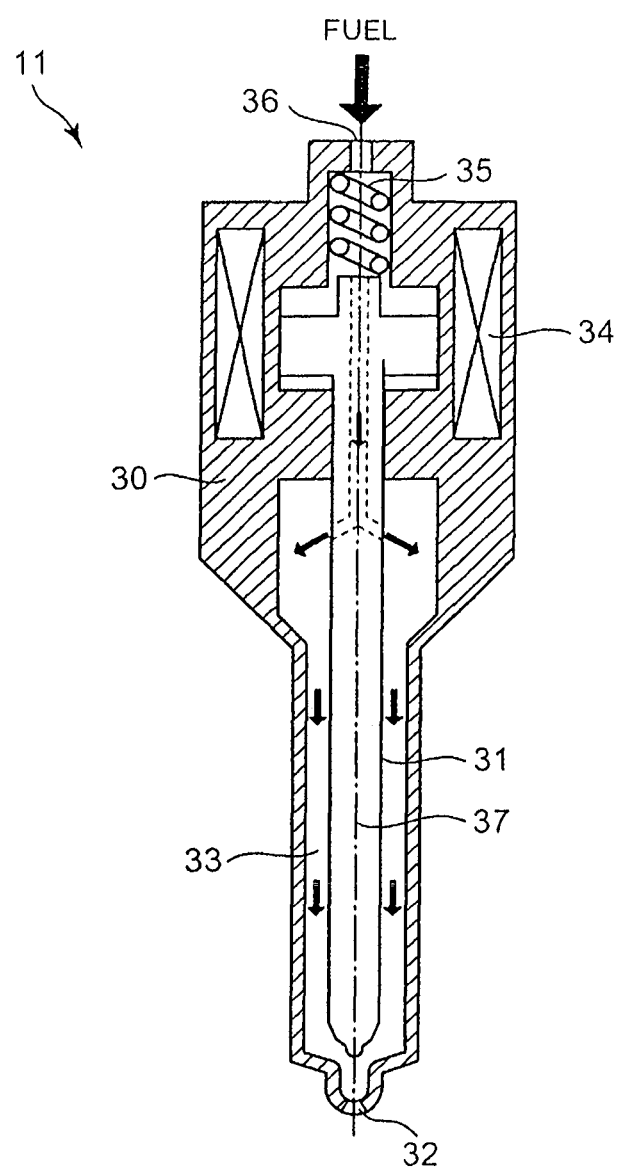
FIG. 3 shows fuel injection valve according to a first embodiment.
Figure 4A:
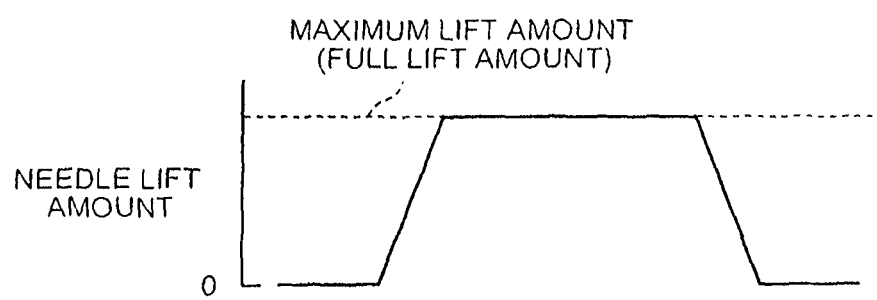
FIG. 4A shows variation in the needle lift amount in the case of full lift injection.
Figure 4B:
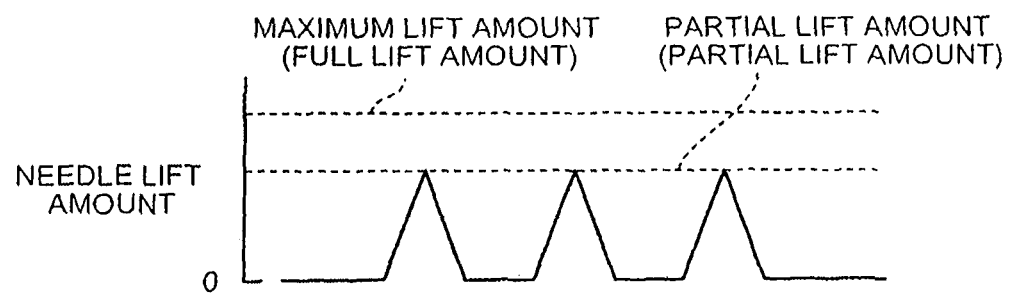
FIG. 4B shows variation in the needle lift amount in the case of partial lift injection.

FIG. 3 shows a configuration of a fuel injection valve 11. In FIG. 3, numeral 30 represents a nozzle, numeral 31 represents a needle valve, numeral 32 represents a fuel injection orifice (called "injection orifice" below), numeral 33 represents a fuel passage, numeral 34 represents a solenoid, numeral 35 represents a spring, numeral 36 represents a fuel intake port, and numeral 37 represents an injection valve axis. The injection valve axis 37 is an axial line extending in the lengthwise direction of the fuel injection valve 11. The fuel injection valve 11 is a fuel injection valve of a so-called inward lifting type. The fuel injection valve 11 can selectively execute either one of full lift injection and partial lift injection. Full lift injection is fuel injection in which the needle valve 31 is lifted up to a maximum amount of lift (in other words, the maximum lift injection), as shown in FIG. 4A, and partial lift injection is fuel injection in which the needle valve 31 is only raised up to an amount of lift which is smaller than the maximum amount of lift (in other words, the partial lift injection), as shown in FIG. 4B. The needle lift amount can be controlled by controlling the current passage time in the fuel injection valve 11. FIG. 4A shows the evolution of the needle lift amount in one full lift injection cycle, and FIG. 4B shows the evolution of the needle lift amount in three full partial lift injections.

Figure 5A:
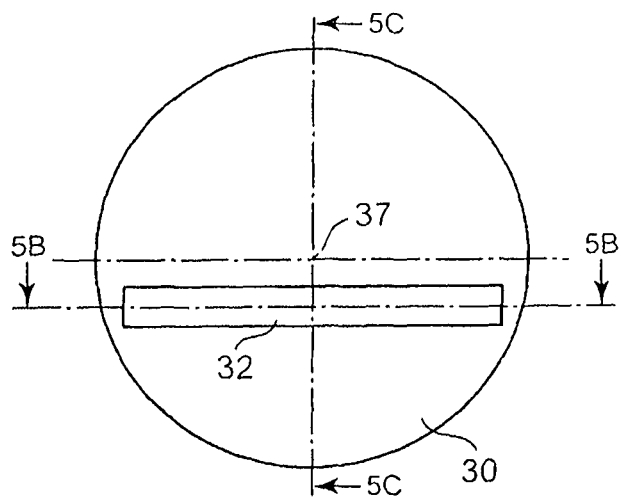
FIG. 5A shows the front tip of the fuel injection valve when the front tip of the fuel injection valve is viewed from outside the fuel injection valve along the injection valve axis.
Figure 5B:
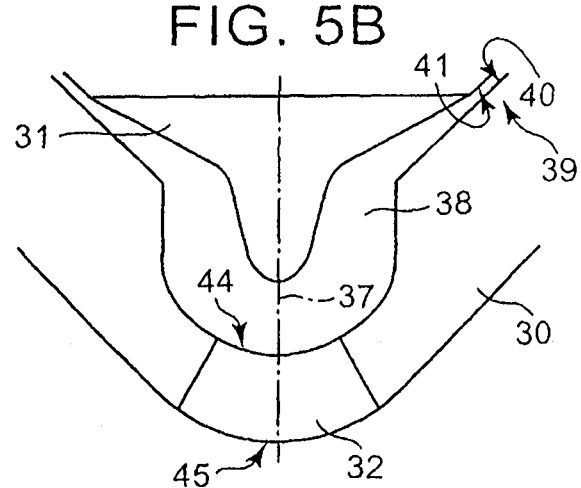
FIG. 5B shows a cross-section along line 5B-5B in FIG. 5A.
Figure 5C:
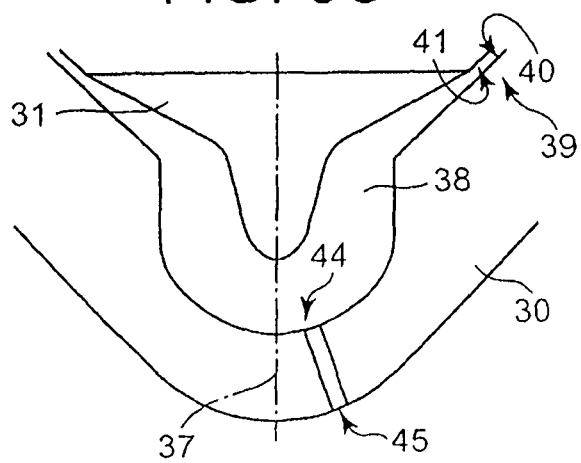
FIG. 5C shows a cross-section along line 5C-5C in FIG. 5A.

FIGS. 5A to 5C show the configuration of an injection orifice 32 of the fuel injection valve 11 according to the first embodiment, and the periphery thereof. FIG. 5A shows the front tip of the fuel injection valve 11 when the front tip of the fuel injection valve 11 is viewed from outside the fuel injection valve 11 along the injection valve axis 37. FIG. 5B shows a cross-section along line 5B-5B in FIG. 5A, and FIG. 5C shows a cross-section along line 5C-5C in FIG. 5A. In FIGS. 5A to 5C, numeral 30 represents a nozzle, numeral 31 represents a needle valve, numeral 32 represents an injection orifice, numeral 37 represents a fuel valve axis, numeral 38 represents a sack, numeral 39 represents a needle seat section ("seat section" below), numeral 40 represents a nozzle seat wall surface, numeral 41 represents a needle seat wall surface, numeral 44 represents an inflow port, and numeral 45 represents an outflow port.

The nozzle seat wall surface 40 is the wall surface where the needle seat wall surface 41 is seated, when the fuel injection valve 11 is fully closed (in other words, when the needle lift amount has become zero).

The injection orifice 32 has an inflow port 44 and an outflow port 45. The inflow port 44 is open towards the sack 38 and fuel flows into the injection orifice 32 via the inflow port 44. The outflow port 45 is open towards the outside of the fuel injection valve 11, and fuel is injected from the outflow port 45.

The injection orifice 32 of the fuel injection valve 11 according to the first embodiment is a slit-shaped injection orifice. In other words, when the injection orifice 32 is viewed in this lateral cross-section as shown in FIG. 5A, the injection orifice 32 has a rectangular-shaped lateral cross-section. Here, the lateral cross-section of the injection orifice is the cross-section when the injection orifice is sectioned in a plane perpendicular to the central axis of the injection orifice. Furthermore, when the injection orifice 32 is viewed along the cross-section B-B, as shown in FIG. 5B, then the injection orifice 32 has a fan shape which expands from the inflow port 44 towards the outflow port 45. Consequently, the flow channel cross-section of the injection orifice 32 gradually becomes larger from the inflow port 44 towards the outflow port 45. Of course, the flow channel cross-section of the outflow port 45 is greater than the flow channel cross-section of the inflow port 44. Furthermore, when the injection orifice 32 is viewed in this longitudinal cross-section, as shown in FIG. 5C, the injection orifice 32 has a substantially rectangular-shaped cross-section. Here, the longitudinal cross-section of the injection orifice is the cross-section obtained when the orifice is sectioned in a single plane that includes the central axis of the injection orifice and the injection valve axis 37.

Figure 6A:
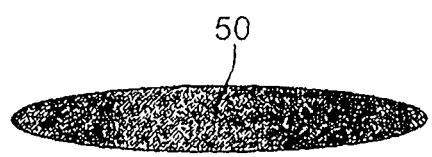
FIG. 6A shows a fuel spray in the case of full lift injection.
Figure 6B:
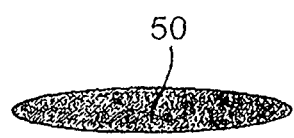
FIG. 6B shows a fuel spray in the case of partial lift injection.

FIGS. 6A and 6B show the fuel spray (called "spray" below) 50 which is injected from the fuel injection valve 11 of the first embodiment. FIGS. 6A and 6B show the spray in a case where the front tip of the fuel injection valve 11 is viewed from outside the fuel injection valve 11 along the injection valve axis 37. FIG. 6A shows a spray in the case of full lift injection, and FIG. 6B shows a spray in the case of partial lift injection.

Figure 7A:
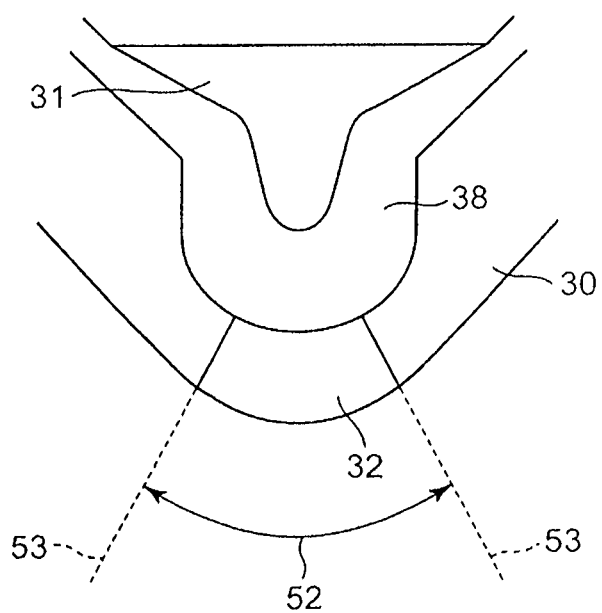
FIG. 7A is a diagram for illustrating a spray angle in the case of full lift injection.
Figure 7B:
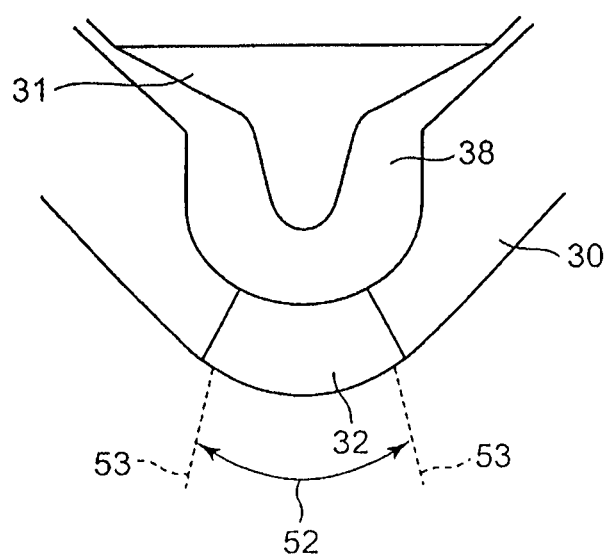
FIG. 7B is a diagram for illustrating a spray angle in the case of partial lift injection.

As shown in FIGS. 7A and 7B, in the fuel injection valve 11 according to the first embodiment, the spray angle 52 in the case of full lift injection (see FIG. 7A) is greater than the spray angle 52 in the case of partial lift injection (see FIG. 7B). Furthermore, the penetrative force in the case of the full lift injection is greater than the penetrative force in the case of the partial lift injection. The spray angle 52 is the angle between the outer edges 53 of the spray, and the penetrative force is the force of the spray advancing inside the cylinder.

The fuel injection control according to the first embodiment is described next. In the description given below, the injection amount is the total amount of fuel that is injected from the fuel injection valve in one cycle of the engine. Engine operation means the operation of the internal combustion engine. Furthermore, divided injection is injection in which fuel of a target injection amount is injected from the fuel injection valve by a plurality of partial lift injections, in one cycle of the engine. Furthermore, normal injection is injection in which fuel of a target injection amount is injected from the fuel injection valve by one full lift injection, in one cycle of the engine.

Figure 8A:
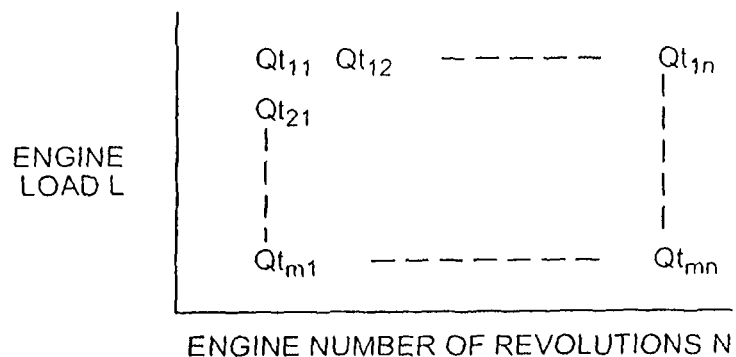
FIG. 8A shows a map of target injection amounts.

In the first embodiment, suitable injection amounts corresponding to the state of engine operation are determined in advance by experimentation, or the like, and the determined injection amounts are stored in the ECU 90 as target injection amounts Qt in the form of a map of functions between the engine number of revolutions N and the engine load L, as shown in FIG. 8A. During engine operation, a target injection amount Qt corresponding to the engine number of revolutions N and the engine load L is acquired from the map in FIG. 8A, and a target number of divisions is acquired (this target number of divisions is described in detailed below). The amount obtained when the target injection amount Qt acquired in this way is divided by the target number of divisions is set as the target injection amount in one partial lift injection (called "target divided injection amount" below). The operation of the fuel injection valve is controlled in such a manner that fuel of the target divided injection volume is injected from the fuel injection valve by respective partial lift injections. In other words, divided injection is executed.

The division number control according to the first embodiment is described next. This control is control for setting the target number of divisions described above. In the description given below, the spray shape is the spray shape of fuel that is injected from the fuel injection valve. Furthermore, the reference spray shape is a spray shape that is predetermined as a normal spray shape. Moreover, the spray shape parameter is a parameter representing the difference in the spray shape from the reference spray shape. Alternatively, the spray shape parameter is a parameter representing a difference between the spray shape in a previously executed partial lift injection and a spray shape in a subsequently executed partial lift injection.

Figure 8B:
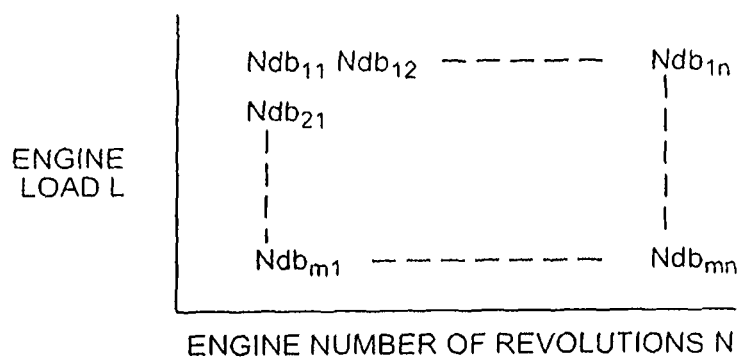
FIG. 8B shows a map of reference numbers of divisions.

In the first embodiment, suitable numbers of divisions corresponding to the state of engine operation are determined in advance by experimentation, or the like, and the determined numbers of divisions are stored in the ECU 90 as reference numbers of divisions Ndb in the form of a map of functions between the engine number of revolutions N and the engine load L, as shown in FIG. 8B. During engine operation, the reference number of divisions Ndb corresponding to the engine number of revolutions N and the engine load L is acquired from the map in FIG. 8B. The reference number of divisions Ndb thus acquired is set as the target number of divisions.

When divided injection is carried out by using the target number of divisions set in this way, if the spray shape parameter is greater than a division number reduction determination value, then a number of divisions obtained by reducing the current number of target divisions by one is set as the new target number of divisions. In this case, since fuel of the target injection amount is injected from the fuel injection valve by a reduced number of partial lift injections, then the injection time of each partial lift injection becomes longer.

If divided injection is executed, then if the spray shape parameter is equal to or less than the division number reduction determination value, the current target number of divisions is not changed.

Figure 9:
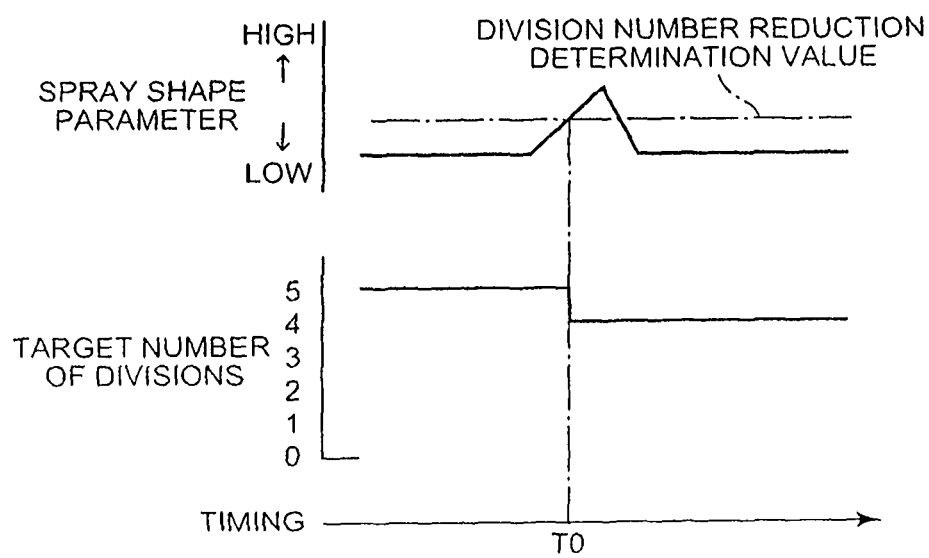
FIG. 9 shows a time chart for illustrating division number control according to the first embodiment.

The division number control according to the first embodiment is described here with reference to the time chart in FIG. 9. As shown in FIG. 9, at or before the time T0, the spray shape parameter is equal to or lower than the division number reduction determination value, and therefore the target number of divisions is not changed and is kept at five. At time T0, if the spray shape parameter becomes larger than the division number reduction determination value, then the target number of divisions is reduced by one and set to four. In so doing, the spray shape parameter becomes equal to or lower than the division number reduction determination value.

The amount of fuel injected by one partial lift injection is very small indeed. Consequently, if divided injection is carried out, there is an advantage in that the particularization of the fuel injected from the fuel injection valve is promoted. However, although this advantage is obtained by execution of divided injection, the needle lift amount in one partial lift injection is very small indeed, and therefore fluctuation occurs in the needle lift amount of each partial lift injection, and in accordance with this, there is a possibility of increase in the fluctuation of the spray shape. If the fluctuation of the spray shape is large, then there is also a possibility of deterioration in the exhaust properties or the drivability.

Here, according to the fuel injection control of the first embodiment, if there is large fluctuation in the spray shape, then the number of divisions is reduced and in accordance with this, the injection time of the partial lift injections becomes longer. Thereby, the needle lift amount in one partial lift injection becomes greater, and the fluctuation in the spray shape becomes smaller. Consequently, it is possible to suppress deterioration of the exhaust gas properties and the drivability. If the exhaust gas includes carbon-monoxide (CO), unburned hydrocarbon (HC), and nitrogen oxides (NOx) in the exhaust gas, and the amounts of these substances are large, then it is considered that the exhaust gas properties have deteriorated.

The spray shape has an effect on factors such as the amount of variation in the torque, the amount of variation in the internal pressure of the cylinder, the amount of variation in the engine number of revolutions, the exhaust gas properties (for instance, the unburned HC amount, etc.), misfiring, and so on. More specifically, if there is large fluctuation in the spray shape, then the amount of variation in the torque is great, the amount of variation in the internal pressure of the cylinder is great, the amount of variation in the engine number of revolutions is great, the exhaust gas properties deteriorate (for instance, the unburned HC amount is great), and the number of misfires is large.

In the first embodiment, the spray shape parameter is calculated on the basis of the amount of variation in the torque, the amount of variation in the internal pressure of the cylinder, the amount of variation in the engine number of revolutions, the exhaust gas properties, the number of misfires, and so on. In this case, the spray shape parameter becomes larger, the greater the amount of variation in the torque, or the greater the amount of variation in the internal pressure of the cylinder, or the greater the amount of variation in the engine number of revolutions, or the greater deterioration in the exhaust gas properties, or the greater the number of misfires.

When calculating the spray shape parameter, it is desirable that this calculation should be carried out if the engine operation is in a steady operating state.

The first embodiment relates to a case where the control apparatus of this invention is applied to an internal combustion engine provided with a fuel injection valve having a slit-shaped injection orifice, but this invention can also be applied to an internal combustion engine provided with a fuel injection valve having an injection orifice of a shape other than a slit shape (for example, an injection orifice having a round cylindrical shape).

Figure 10:
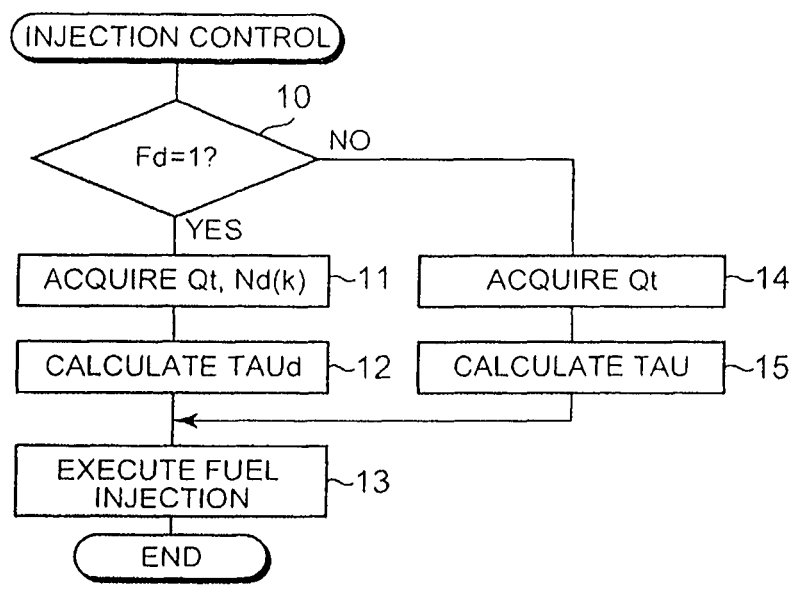
FIG. 10 shows one example of a fuel injection control flow according to the first embodiment.

The fuel injection control flow according to the first embodiment is described next. One example of this flow is illustrated in FIG. 10. When the flow in FIG. 10 is started, firstly, in step 10, it is determined whether or not a divided injection execution flag Fd has been set (Fd=1). The divided injection execution flag Fd is set when the execution of divided injection is requested, and is reset when the execution of normal injection is requested. In step 10, if it is determined that Fd=1, then the flow advances to step 11. On the other hand, if it is determined that Fd is not 1, then the flow advances to step 14.

In step 11, the target injection amount Qt and the target number of divisions Nd(k) are acquired. Thereupon, in step 12, a valve opening time TAUd for injecting from the fuel injection valve, in each partial lift injection, an amount (=Qt/Nd(k)) obtained by dividing the target injection amount Qt acquired in step 11 by the target number of divisions Nd(k) acquired in step 11, is calculated. Thereupon, in step 13, fuel injection is executed using the valve opening time TAUd calculated in step 12, and the flow is terminated. More specifically, fuel injection for opening the fuel injection valve is executed in the respective partial lift injections during the valve opening time TAUd calculated in step 12, and the flow is terminated.

In step 14, the target injection amount Qt is acquired. Thereupon, in step 15, the valve opening time TAU for injecting the target injection amount Q acquired in step 14, by one full lift injection, from the fuel injection valve, is calculated. Thereupon, in step 13, fuel injection is executed using the valve opening time TAU calculated in step 15, and the flow is terminated. More specifically, fuel injection for opening the fuel injection valve is executed in a full lift injection during the valve opening time TAU calculated in step 15, and the flow is terminated.

Figure 11:
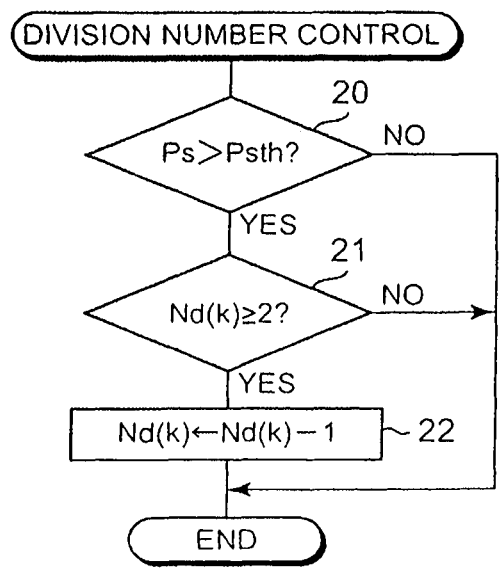
FIG. 11 shows one example of a division number control flow according to the first embodiment.

The division number control flow according to the first embodiment is described next. One example of this flow is illustrated in FIG. 11. When the flow in FIG. 11 is started, firstly, in step 20, it is determined whether or not the spray shape parameter Ps is greater than the division number reduction determination value Psth (Ps>Psth). Here, if it is determined that Ps>Psth, then the flow advances to step 21. On the other hand, if it is determined that Ps>Psth is not established, then the flow terminates directly. In this case, reduction of the target number of divisions is not carried out.

In step 21, it is determined whether or not the current target number of divisions Nd(k) is equal to or greater than 2 (Nd(k)≥2). Here, if it is determined that Nd(k)≥2, then the flow advances to step 22, the target number of divisions Nd(k) is reduced by one, and the flow is terminated. On the other hand, if it is determined that Nd(k)>2 is not established, then the flow terminates directly. In this case, reduction of the target number of divisions is not carried out.

The division number control according to a second embodiment is described next. In some of the embodiments described below, the configuration and control of respective embodiments which are not described are respectively the same as the configuration and control of the other embodiments which are described in this specification, or are a configuration and control that could evidently be deduced from the configuration and control of the other embodiments upon considering the configuration or control of the respective embodiments.

In the division number control according to the second embodiment, when divided Injection is carried out, if the spray shape parameter is greater than the division number reduction determination value, then the number of divisions obtained by reducing the current target number of divisions by one is set as the new target number of divisions. In this case, since fuel of the target injection amount is injected from the fuel injection valve by a reduced number of partial lift injections, then the injection time of each partial lift injection becomes longer.

Thereupon, if the spray shape parameter is still greater than the division number reduction determination value, after reducing the target number of divisions, then the execution of divided injections is prohibited. In this case, normal injection is carried out.

Figure 12:
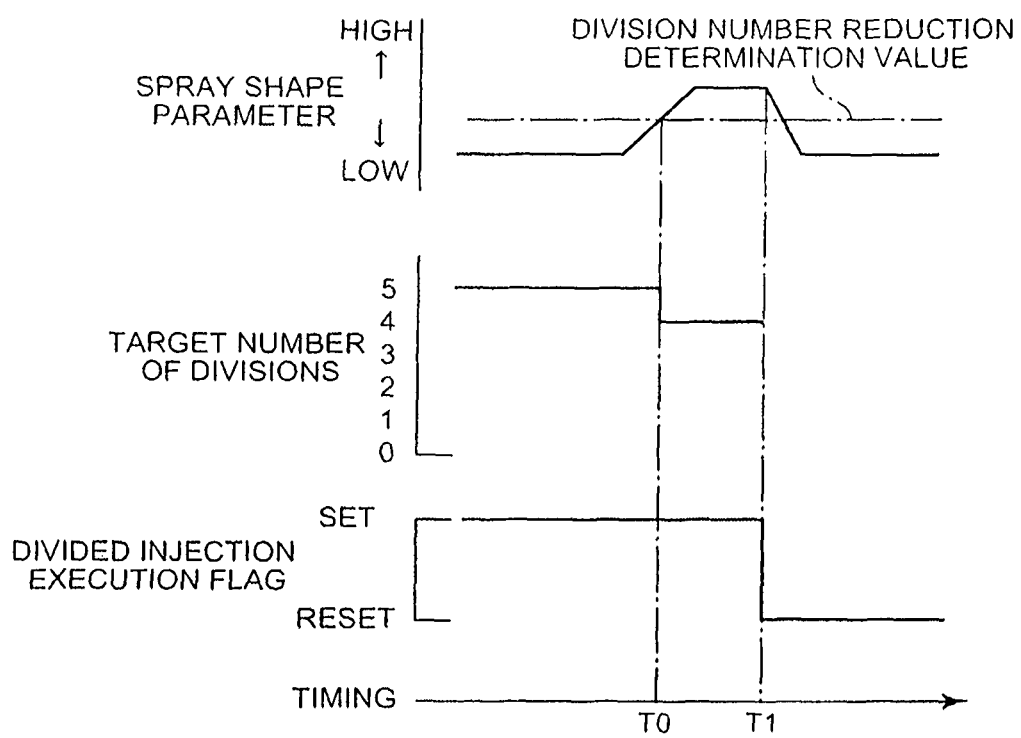
FIG. 12 shows a time chart for illustrating division number control according to a second embodiment.

The division number control according to the second embodiment is described here with reference to the time chart in FIG. 12. As shown in FIG. 12, up to the time T0, the divided injection execution flag is set, and therefore the target number of divisions is set to five and divided injection is executed. At and before the time T0, the spray shape parameter is equal to or lower than the division number reduction determination value, and therefore the target number of divisions is not changed and is kept at five. At time T0, if the spray shape parameter becomes larger than the division number reduction determination value, then the target number of divisions is reduced by one and set to four.

From time T0 on, divided injection is executed with the target number of divisions set to four. In this case, since the spray shape parameter is still greater than the division number reduction determination value, then the divided injection execution flag is reset at time T1. In other words, the execution of divided injection is prohibited.

According to the fuel injection control of the second embodiment, if the spray shape parameter is large, in other words, if fluctuation in the spray shape has not been eliminated, despite having reduced the number of divisions, then the execution of divided injection is prohibited and thereafter normal injection is executed. Consequently, it is possible to more reliably suppress deterioration of the exhaust gas properties and the drivability.

Figure 13:
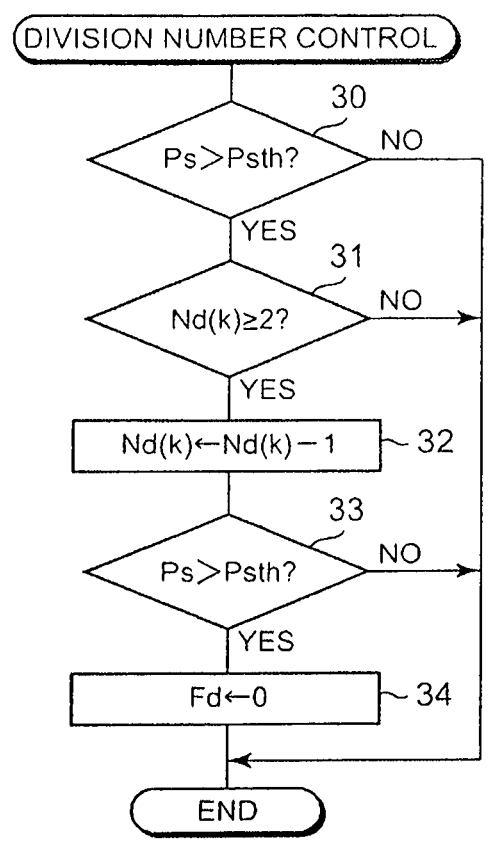
FIG. 13 shows one example of a division number control flow according to the second embodiment.

The division number control flow according to the second embodiment is described next. One example of this flow is illustrated in FIG. 13. When the flow in FIG. 13 is started, firstly, in step 30, it is determined whether or not the spray shape parameter Ps is greater than the division number reduction determination value Psth (Ps>Psth). Here, if it is determined that Ps>Psth, then the flow advances to step 31. On the other hand, if it is determined that Ps>Psth is not established, then the flow terminates directly. In this case, reduction of the target number of divisions is not carried out.

In step 31, it is determined whether or not the current target number of divisions Nd(k) is equal to or greater than 2 (Nd(k)≥2). Here, if it is determined that Nd(k)≥2, then the flow advances to step 32, the target number of divisions Nd(k) is reduced by one, and the flow then advances to step 33. On the other hand, if it is determined that Nd(k)≥2 is not established, then the flow terminates directly. In this case, reduction of the target number of divisions is not carried out.

In step 33, it is determined whether or not the spray shape parameter Ps is greater than the division number reduction determination value Psth (Ps>Psth). Here, if it is determined that Ps>Psth, then the flow advances to step 34, the divided injection execution flag Fd is reset, and the flow terminates. In this case, the execution of divided injection is prohibited and normal injection is executed. On the other hand, if it is determined that Ps>Psth is not established, then the flow terminates directly. In this case, divided injection is executed in accordance with the target number of divisions that has been reduced in step 32.

The division number control according to a third embodiment is described next. In this control, if the spray shape parameter relating to any one cylinder (called "particular cylinder" below) is greater than the division number reduction determination value when divided injection is executed, then the number of divisions obtained by reducing the current target number of divisions by one is set as the new target number of divisions for the cylinder in question. In this case, since fuel of the target injection amount is injected from the fuel injection valve by a reduced number of partial lift injections in respect of the cylinder in question, then the injection time of each partial lift injection becomes longer.

If the spray shape parameter is still larger than the division number reduction determination value after having reduced the target number of divisions relating to the cylinder in question, then the execution of divided injection is prohibited in relation to that cylinder, and the number of divisions obtained by increasing the current target number of divisions by one is set as a new target number of divisions for the other cylinders. In this case, since fuel of the target injection amount is injected from the fuel injection valve by an increased number of partial lift injections in respect of the other cylinders, then the injection time of each partial lift injection becomes shorter.

Figure 14:
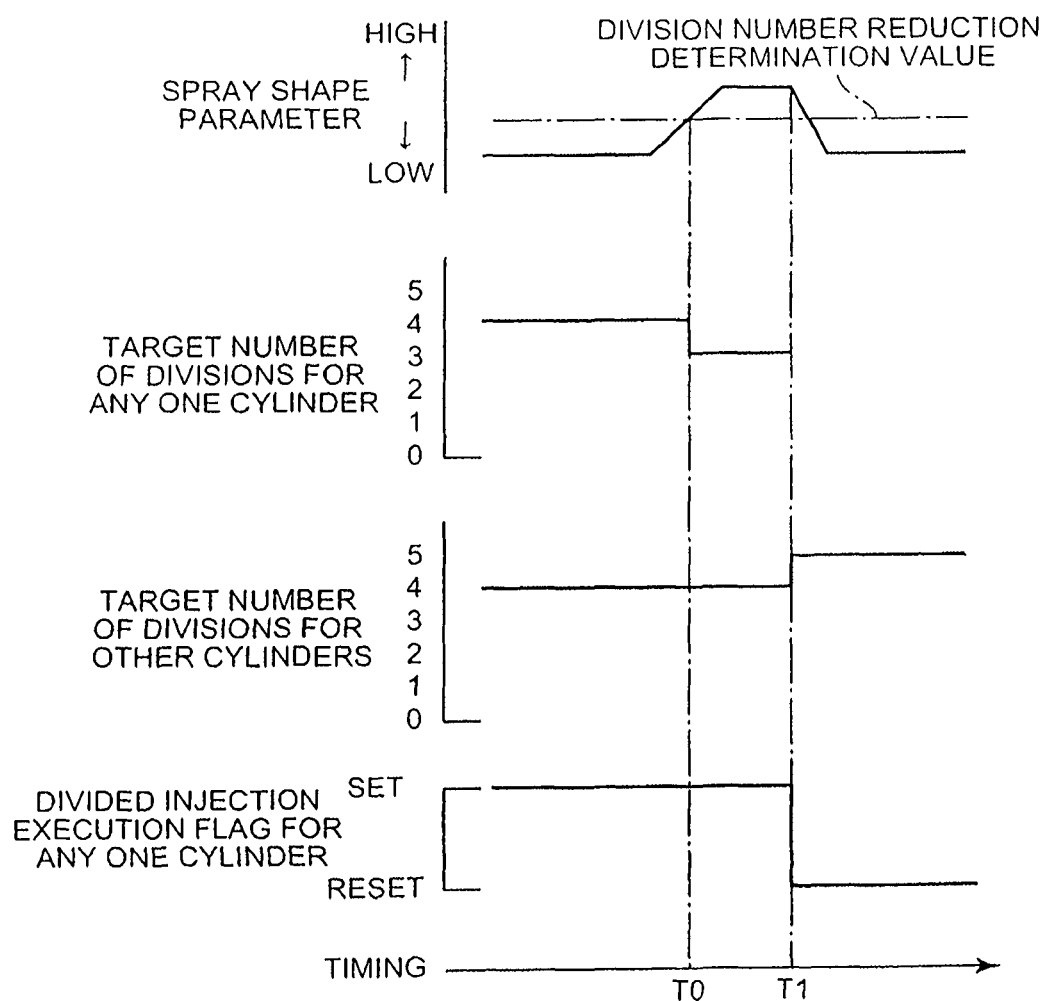
FIG. 14 shows a time chart for illustrating division number control according to a third embodiment.

The division number control according to the third embodiment is described here with reference to the time chart in FIG. 14. As shown in FIG. 14, up to the time T0, the divided injection execution flag relating to the particular cylinder is set, and therefore the target number of divisions is set to four for that particular cylinder and divided injection is executed therein. In the other cylinders also, the target number of divisions is set to four and divided injection is executed. At and before the time T0, the spray shape parameter relating to the particular cylinder is equal to or lower than the division number reduction determination value, and therefore the target number of divisions is not changed and is kept at four. At time T0, if the spray shape parameter relating to the particular cylinder becomes larger than the division number reduction determination value, then the target number of divisions is reduced by one and set to three.

From time T0 on, divided injection is executed with the target number of divisions set to three, in the particular cylinder. In this case, since the spray shape parameter relating to the particular cylinder is still greater than the division number reduction determination value, then the divided injection execution flag is reset at time T1. In other words, the execution of divided injection is prohibited. Simultaneously with this, the target number of divisions for the other cylinders is increased by one to five. In other words, in the other cylinders, divided injection is executed with the target number of divisions set to five.

As described previously, the amount of fuel injected by one partial lift injection is very small indeed. Consequently, if divided injection is carried out, there is an advantage in that the particularization of the fuel injected from the fuel injection valve is promoted. Consequently, if execution of divided injection is prohibited in a particular cylinder, then no advantage is obtained from the divided injection in relation to this cylinder. However, according to the fuel injection control of the third embodiment, if the execution of the divided injection is prohibited in a particular cylinder, then since the target number of divisions is increased in the other cylinders, it is possible to maintain the advantage obtained from divided injection in the internal combustion engine as a whole.

Figure 15:
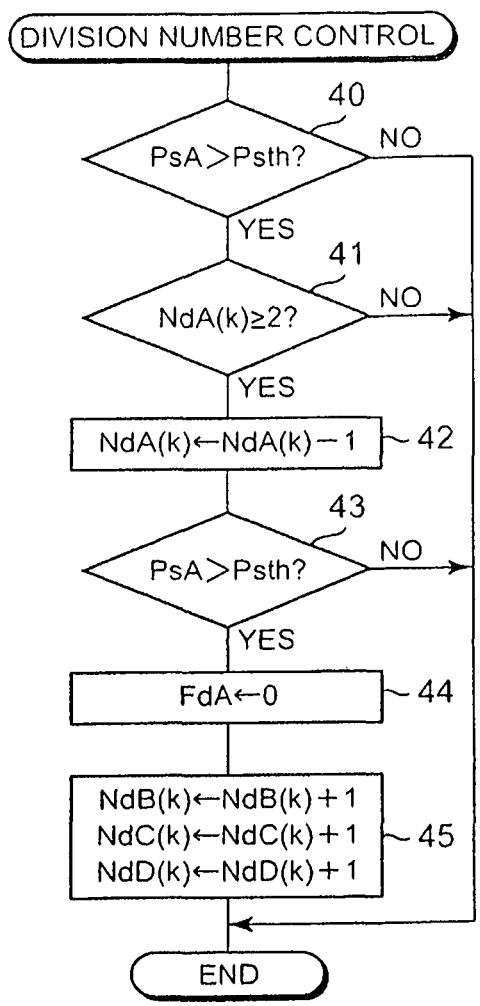
FIG. 15 shows one example of a division number control flow according to the third embodiment.

The division number control flow according to the third embodiment is described next. One example of this flow is illustrated in FIG. 15. When the flow in FIG. 15 is started, firstly, in step 40, it is determined whether or not the spray shape parameter PsA is greater than the division number reduction determination value Psth (PsA>Psth) in a particular cylinder. Here, if it is determined that PsA>Psth, then the flow advances to step 41. On the other hand, if it is determined that PsA>Psth is not established, then the flow terminates directly. In this case, reduction of the target number of divisions is not carried out in relation to the particular cylinder.

In step 41, it is determined whether or not the current target number of divisions NdA(k) in relation to the particular cylinder is equal to or greater than 2 (NdA(k)≥2). Here, if it is determined that NdA(k)≥2, then the flow advances to step 42, the target number of divisions NdA(k) is reduced by one, and the flow then advances to step 43. On the other hand, if it is determined that NdA(k)≥2 is not established, then the flow terminates directly. In this case, reduction of the target number of divisions is not carried out in relation to the particular cylinder.

In step 43, it is determined whether or not the spray shape parameter PsA relating to the particular cylinder is greater than the division number reduction determination value Psth (PsA>Psth). Here, if it is determined that PsA>Psth, then the flow advances to step 44. On the other hand, if it is determined that PsA>Psth is not established, then the flow terminates directly. In this case, divided injection is executed in the particular cylinder, in accordance with the target number of divisions that has been reduced in step 42.

In step 44, the divided injection execution flag FdA relating to the particular cylinder is reset. Next, in step 45, the target number of divisions NdB(k), NdC(k) and NdD(k) relating to the other cylinders are increased by one and the flow is terminated.

In the third embodiment, it is also possible to increase the target number of divisions of only one of the other cylinders, if the target number of divisions of the particular cylinder is reduced. One example of the division number control flow in this case is illustrated in FIG. 16.

Figure 16:
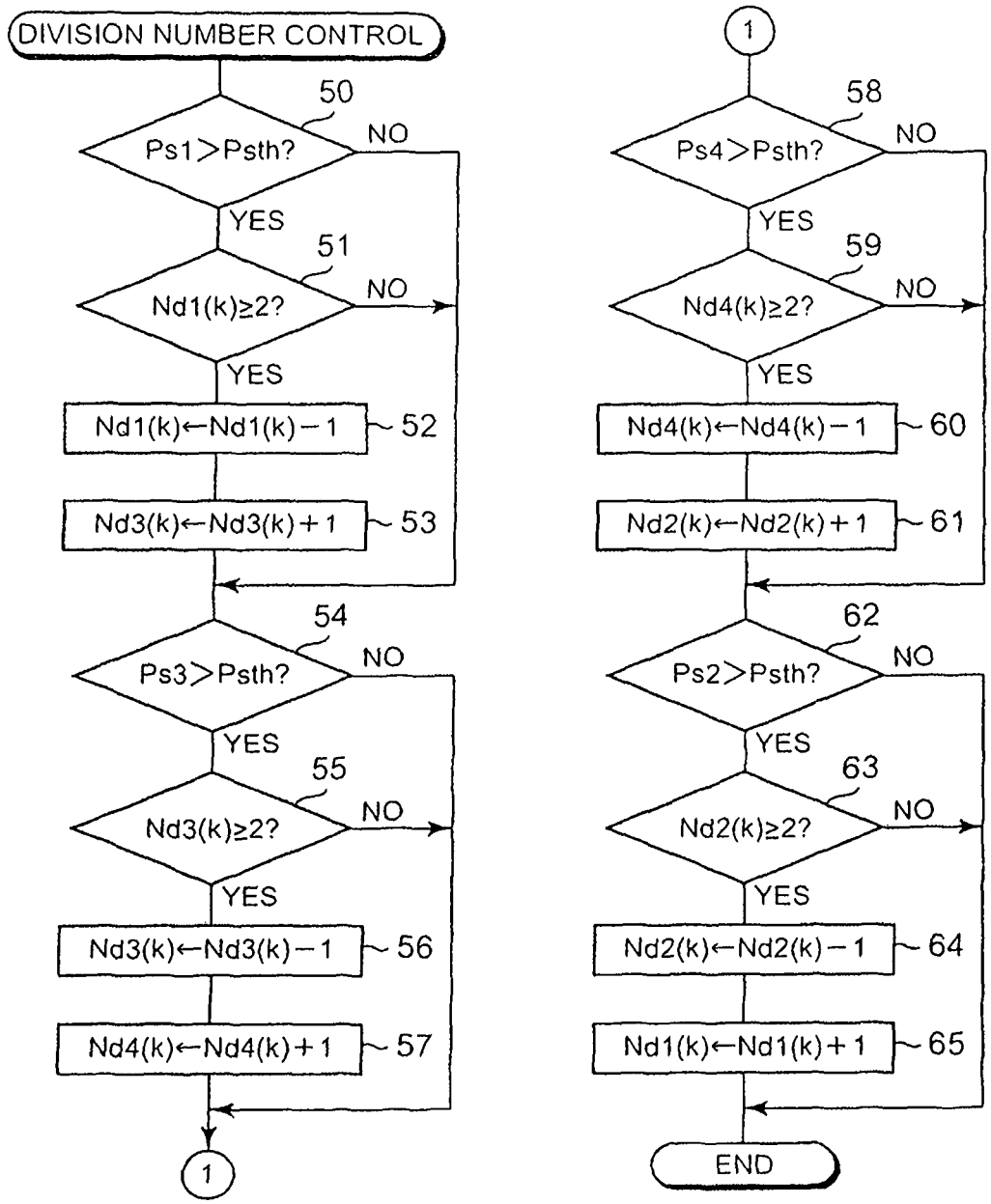
FIG. 16 shows a further example of a division number control flow according to the third embodiment.

When the flow in FIG. 16 is started, firstly, in step 50, it is determined whether or not the spray shape parameter Ps1 in the first cylinder is greater than the division number reduction determination value Psth (Ps1>Psth). Here, if it is determined that Ps1>Psth, then the flow advances to step 51. On the other hand, if it is determined that Ps1>Psth is not established, then the flow advances to step 54. In this case, reduction of the target number of divisions of the first cylinder is not carried out.

In step 51, it is determined whether or not the current target number of divisions Nd1(k) for the first cylinder is equal to or greater than 2 (Nd1(k)≥2). Here, if it is determined that Nd1(k)≥2, then the flow advances to step 52. On the other hand, if it is determined that Nd1(k)≥2 is not established, then the flow advances to step 54. In this case, reduction of the target number of divisions of the first cylinder is not carried out.

In step 52, the total number of divisions Nd1(k) of the first cylinder is reduced by one. Next, in step 53, the total number of divisions Nd3(k) of the third cylinder is increased by one, and the flow advances to step 54.

In step 54, it is determined whether or not the spray shape parameter Ps3 for the third cylinder is greater than the division number reduction determination value Path (Ps3>Path). Here, if it is determined that Ps3>Path, then the flow advances to step 55. On the other hand, if it is determined that Ps3>Path is not established, then the flow advances to step 58. In this case, reduction of the target number of divisions of the third cylinder is not carried out.

In step 55, it is determined whether or not the current target number of divisions Nd3(k) for the third cylinder is equal to or greater than 2 (Nd3(k)≥2). Here, if it is determined that Nd3(k)≥2, then the flow advances to step 56. On the other hand, if it is determined that Nd3(k)≥2 is not established, then the flow advances to step 58. In this case, reduction of the target number of divisions of the third cylinder is not carried out.

In step 56, the total number of divisions Nd3(k) of the third cylinder is reduced by one. Next, in step 57, the total number of divisions Nd4(k) of the fourth cylinder is increased by one, and the flow advances to step 58.

In step 58, it is determined whether or not the spray shape parameter Ps4 for the fourth cylinder is greater than the division number reduction determination value Psth (Ps4>Psth). Here, if it is determined that Ps4>Psth, then the flow advances to step 59. On the other hand, if it is determined that Ps4>Psth is not established, then the flow advances to step 62. In this case, reduction of the target number of divisions of the fourth cylinder is not carried out.

In step 59, it is determined whether or not the current target number of divisions Nd4(k) for the fourth cylinder is equal to or greater than 2 (Nd4(k)≥2). Here, if it is determined that Nd4(k)≥2, then the flow advances to step 60. On the other hand, if it is determined that Nd4(k)≥2 is not established, then the flow advances to step 62. In this case, reduction of the target number of divisions of the fourth cylinder is not carried out.

In step 60, the total number of divisions Nd4(k) of the fourth cylinder is reduced by one. Next, in step 61, the total number of divisions Nd2(k) of the second cylinder is increased by one, and the flow advances to step 62.

In step 62, it is determined whether or not the spray shape parameter Ps2 for the second cylinder is greater than the division number reduction determination value Psth (Ps2>Psth). Here, if it is determined that Ps2>Psth, then the flow advances to step 63. On the other hand, if it is determined that Ps2>Psth is not established, then the flow terminates directly. In this case, reduction of the target number of divisions of the second cylinder is not carried out.

In step 63, it is determined whether or not the current target number of divisions Nd2(k) for the second cylinder is equal to or greater than 2 ($Nd2(k) \geq 2$). Here, if it is determined that $Nd2(k) \geq 2$, then the flow advances to step 64. On the other hand, if it is determined that $Nd2(k) \geq 2$ is not established, then the flow terminates directly. In this case, reduction of the target number of divisions of the second cylinder is not carried out.

In step 64, the total number of divisions $Nd2(k)$ of the second cylinder is reduced by one. Next, in step 65, the total number of divisions $Nd1(k)$ of the first cylinder is increased by one, and the flow terminates.

The division number control according to a fourth embodiment is described next. When divided injection is carried out, if the spray shape parameter is greater than the division number reduction determination value, then the number of divisions obtained by reducing the current target number of divisions by one is set as the new target number of divisions. In this case, since fuel of the target injection amount is injected from the fuel injection valve by a reduced number of partial lift injections, then the injection time of each partial lift injection becomes longer.

On the other hand, if the spray shape parameter is smaller than the division number reduction determination value when divided injection is carried out, then the number of divisions obtained by increasing the current target number of divisions by one is set as the target number of divisions. In this case, since fuel of the target injection amount is injected from the fuel injection valve by an increased number of partial lift injections, then the injection time of each partial lift injection becomes shorter.

According to the fuel injection control of the fourth embodiment, the number of divisions is increased if there is a possibility of the fluctuation in the spray shape coming within a tolerable range if the number of divisions is increased. Therefore, it is possible to gain the advantage of divided injection more effectively.

Figure 17:
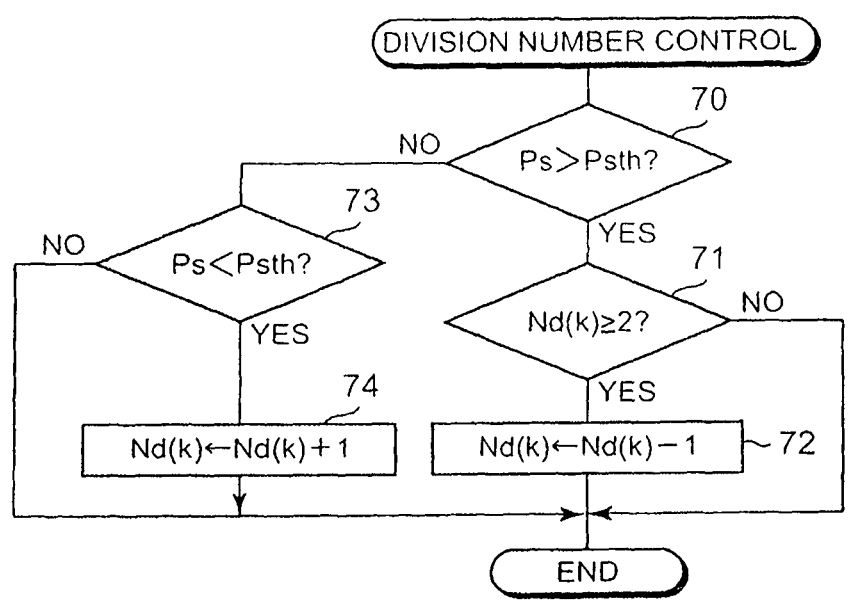
FIG. 17 shows one example of a division number control flow according to a fourth embodiment.

The division number control flow according to the fourth embodiment is described next. One example of this flow is illustrated in FIG. 17. When the flow in FIG. 17 is started, firstly, in step 70, it is determined whether or not the spray shape parameter Ps is greater than the division number reduction determination value Psth (Ps>Psth). Here, if it is determined that Ps>Psth, then the flow advances to step 71. On the other hand, if it is determined that Ps>Psth is not established, then the flow advances to step 73.

In step 71, it is determined whether or not the current target number of divisions $Nd(k)$ is equal to or greater than 2 ($Nd(k) \geq 2$). Here, if it is determined that $Nd(k) \geq 2$, then the flow advances to step 72, the target number of divisions $Nd(k)$ is reduced by one, and the flow is terminated. On the other hand, if it is determined that $Nd(k) \geq 2$ is not established, then the flow terminates directly. In this case, reduction of the target number of divisions is not carried out.

In step 73, it is determined whether or not the spray shape parameter Ps is smaller than the division number reduction determination value Psth (Ps<Psth). Here, if it is determined that Ps<Psth, then the flow advances to step 74, the target number of divisions $Nd(k)$ is increased by one, and the flow is terminated. On the other hand, if it is determined that Ps<Psth is not established, then the flow terminates directly. In this case, increase of the target number of divisions is not carried out.

The division number control according to a fifth embodiment is described next. In this control, if the spray shape parameter relating to any one cylinder (called "particular cylinder" below) is greater than the division number reduction determination value, when divided injection is executed, then the number of divisions obtained by reducing the current target number of divisions by one is set as the new target number of divisions for that cylinder. In this case, since fuel of the target injection amount is injected from the fuel injection valve by a reduced number of partial lift injections in respect of the cylinder in question, then the injection time of each partial lift injection becomes longer.

If the spray shape parameter is still larger than the division number reduction determination value after having reduced the target number of divisions relating to the cylinder in question, then the execution of divided injection is prohibited in relation to that cylinder, and the number of divisions obtained by increasing the current target number of divisions by one is set as a new target number of divisions for the other cylinders. In this case, since fuel of the target injection amount is injected from the fuel injection valve by an increased number of partial lift injections in respect of the other cylinders, then the injection time of each partial lift injection becomes shorter.

On the other hand, if the spray shape parameter for a particular cylinder is smaller than the division number reduction determination value, when divided injection is carried out, then the number of divisions obtained by increasing the current target number of divisions by one is set as the target number of divisions for the cylinder in question. In this case, since fuel of the target injection amount is injected from the fuel injection valve by an increased number of partial lift injections in respect of the cylinder in question, then the injection time of each partial lift injection becomes shorter.

According to the fuel injection control of the fifth embodiment, if the execution of the divided injection is prohibited in a particular cylinder, then since the target number of divisions is increased in the other cylinders, it is possible to maintain the advantage from divided injection in the internal combustion engine as a whole. Moreover, according to the fuel injection control according to the fifth embodiment, there may be increase in the total number of divisions. However, if there is increase in the total number of divisions when the spray shape parameter is not equal to or lower than the division number reduction determination value, regardless of the fact that the total number of divisions has been reduced, then there is a high probability of the spray shape parameter becoming greater than the division number reduction determination value. Consequently, in this case, it is not regarded as desirable to carry out increase of the total number of divisions. According to the fuel injection control of the fifth embodiment, execution of divided injection is prohibited in cases such as these. Therefore, it is possible to more reliably suppress deterioration of the exhaust gas properties and the drivability.

Figure 18:
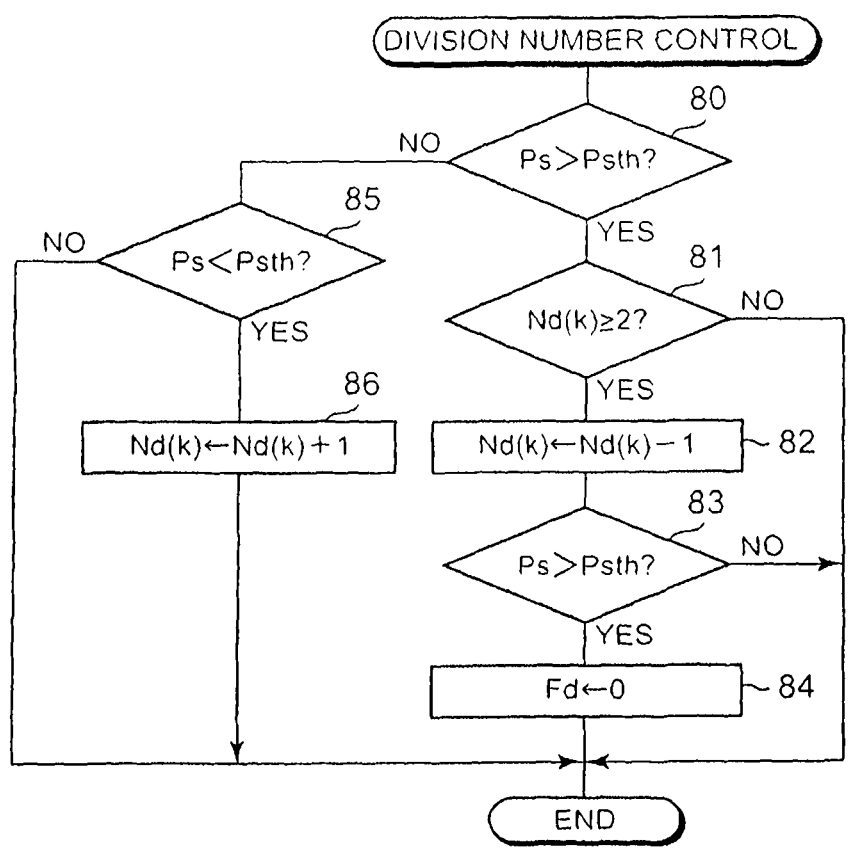
FIG. 18 shows one example of a division number control flow according to a fifth embodiment.

The division number control flow according to the fifth embodiment is described next. One example of this flow is illustrated in FIG. 18. When the flow in FIG. 18 is started, firstly, in step 80, it is determined whether or not the spray shape parameter Ps is greater than the division number reduction determination value Psth (Ps>Psth). Here, if it is determined that Ps>Psth, then the flow advances to step 81. On the other hand, if it is determined that Ps>Psth is not established, then the flow advances to step 85.

In step 81, it is determined whether or not the current target number of divisions $Nd(k)$ is equal to or greater than 2 ($Nd(k) \geq 2$). Here, if it is determined that $Nd(k) \geq 2$, then the flow advances to step 82, the target number of divisions $Nd(k)$ is reduced by one, and the flow then advances to step 83. On the other hand, if it is determined that $Nd(k) > 2$ is not established, then the flow terminates directly. In this case, reduction of the target number of divisions is not carried out.

In step 83, it is determined whether or not the spray shape parameter Ps is greater than the division number reduction determination value Psth (PsA>Psth). Here, if it is determined that PsA>Psth, then the flow advances to step 84, the divided injection execution flag Fd is reset, and the flow terminates. On the other hand, if it is determined that PsA>Psth is not established, then the flow terminates directly. In this case, divided injection is executed in accordance with the target number of divisions that has been reduced in step 82.

In step 85, it is determined whether or not the spray shape parameter Ps is smaller than the division number reduction determination value Psth (Ps<Psth). Here, if it ii determined that Ps<Psth, then the flow advances to step 86, the target number of divisions Nd(k) is increased by one, and the flow is terminated. On the other hand, if it is determined that Ps<Psth is not established, then the flow terminates directly. In this case, increase of the target number of divisions is not carried out.

The division number control according to a sixth embodiment is described next. In this control, if the spray shape parameter is greater than the division number reduction determination value in a particular cylinder, when divided control is executed, then the number of divisions obtained by reducing the current total number of divisions by one is set as the new total number of divisions, for the particular cylinder, and the number 26 of divisions obtained by increasing the current total number of divisions by one is set as the new total number of divisions, for the other cylinders.

As described above, divided injection exhibits an advantage in that the particularization of the fuel injected from the fuel injection valve is thereby promoted. Consequently, if the number of divisions is reduced in a particular cylinder, then the advantage gained from divided injection in that particular cylinder is reduced. According to the fuel injection control according to the sixth embodiment, if the number of partial injections in one engine cycle is increased in the other cylinders, then it is possible to maintain the advantage gained from divided injection in the internal combustion engine as a whole.

Figure 19:
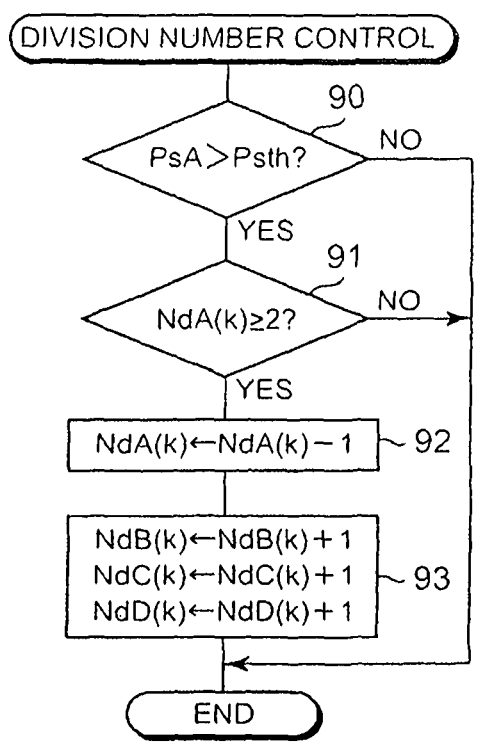
FIG. 19 shows one example of a division number control flow according to a sixth embodiment.

The division number control flow according to the sixth embodiment is described next. One example of this flow is illustrated in FIG. 19. When the flow in FIG. 19 is started, firstly, in step 90, it is determined whether or not the spray shape parameter PsA is greater than the division number reduction determination value Psth (PsA>Psth) in a particular cylinder. Here, if it is determined that PsA>Psth, then the flow advances to step 91. On the other hand, if it is determined that PsA>Psth is not established, then the flow terminates directly. In this case, reduction of the target number of divisions is not carried out in relation to the particular cylinder.

In step 91, it is determined whether or not the current target number of divisions NdA(k) is equal to or greater than 2 (NdA(k)≥2) in relation to the particular cylinder. Here, if it is determined that NdA(k)≥2, then the flow advances to step 92. On the other hand, if it is determined that NdA(k)≥2 is not established, then the flow terminates directly. In this case, reduction of the target number of divisions is not carried out in relation to the particular cylinder.

In step 92, the total number of divisions NdA(k) is reduced by one. Next, in step 93, the target number of divisions NdB(k), NdC(k) and NdD(k) relating to the other cylinders are increased by one and the flow is terminated.

In the description given above, this invention was explained with reference to an example in which a fuel injection valve is installed in the portion of the engine main body on the intake valve side of the upper portion of the interior of the cylinder, but this invention may also be applied to a case where a fuel injection valve is installed in any portion of the engine main body, provided that the fuel injection valve injects fuel directly inside the cylinder.

Furthermore, in the description given above, this invention was explained with reference to an example in which fuel of a target injection amount is injected from a fuel injection valve by a plurality of partial lift injections, but this invention can also be applied to a case wherein fuel of a partial amount of the target injection amount is injected from the fuel injection valve by a full lift injection, in addition to which fuel of the remaining amount of the target injection amount (in other words, a prescribed amount of fuel) is injected from the fuel injection valve by a plurality of partial lift injections.

From the description given above, the control apparatus of the aforementioned embodiments can be regarded, broadly speaking, as a control apparatus applied to an internal combustion engine 10 provided with a fuel injection valve 11 directly injecting fuel inside a cylinder (in other words, a combustion chamber 18), the control apparatus executing divided injection control for injecting fuel from the fuel injection valve by a plurality of partial lift injections and having a control unit (for example, an ECU 90) that executes division number reduction control to reduce the number Nd(k) of partial lift injections in one engine cycle and lengthen the injection period TAUd of each partial lift injection, if the value of the spray shape parameter Ps representing the spray shape fluctuation is greater than a division number reduction determination value Psth.

What is claimed is:

1. A control apparatus for an internal combustion engine, the internal combustion engine including a fuel injection valve injecting fuel directly into a cylinder, the control apparatus comprising:
   an ECU configured to:
   (a) execute a divided injection control for injecting fuel from the fuel injection valve by a plurality of partial lift injections; and
   (b) execute a division number reduction control when a value of a spray shape parameter representing spray shape fluctuation is greater than a division number reduction determination value, the division number reduction control being control to reduce the number of partial lift injections in one engine cycle and to lengthen an injection time of each of the partial lift injections.

2. The control apparatus according to claim 1, wherein the ECU prohibits the execution of the divided injection control, when the value of the spray shape parameter after execution of the division number reduction control is greater than the division number reduction determination value.

3. The control apparatus according to claim 2, wherein the internal combustion engine is provided with a plurality of cylinders, and the ECU executes a division number compensation control when execution of the divided injection control is prohibited for one cylinder, the division number compensation control being control to increase the number of partial lift injections in one engine cycle and shorten the injection time of each partial lift injection, in at least one of the remaining cylinders.

4. The control apparatus according to claim 1, wherein the internal combustion engine is provided with a plurality of cylinders, and the ECU executes a division number compensation control when the division number reduction control is executed for one cylinder, the division number compensation control being control to increase the number of partial lift injections in one engine cycle and to shorten the injection time of each of the partial lift injections, in at least one of the remaining cylinders.

5. The control apparatus according to claim 1, wherein the ECU executes a division number increase control, when the value of the spray shape parameter is smaller than the division number reduction determination value, the division number increase control being control to increase the number of partial lift injections in one engine cycle and to shorten the injection time of each of the partial lift injections.

6. A control method for an internal combustion engine, the internal combustion engine including a fuel injection valve injecting fuel directly into a cylinder, and an ECU, the control method comprising:
executing, by the ECU, a divided injection control to inject fuel from the fuel injection valve by a plurality of partial lift injections; and
executing, by the ECU, a division number reduction control when a value of a spray shape parameter representing spray shape fluctuation is greater than a division number reduction determination value, the division number reduction control being control to reduce the number of partial lift injections in one engine cycle and to lengthen the injection time of each of the partial lift injections.

7. The control method according to claim 6, wherein the execution of the divided injection control is prohibited by the ECU, when the value of the spray shape parameter after execution of the division number reduction control is greater than the division number reduction determination value.

8. The control method according to claim 7, wherein the internal combustion engine is provided with a plurality of cylinders and a division number compensation control is executed by the ECU when execution of the divided injection control is prohibited for one cylinder, the division number compensation control being control to increase the number of partial lift injections in one engine cycle and to shorten the injection time of each of the partial lift injections, in at least one of the remaining cylinders.

9. The control method according to claim 6, wherein the internal combustion engine is provided with a plurality of cylinders and a division number compensation control is executed by the ECU when the division number reduction control is executed for one cylinder, the division number compensation control being control to increase the number of partial lift injections in one engine cycle and to shorten the injection time of each of the partial lift injections, in at least one of the remaining cylinders.

10. The control method according to claim 6, wherein a division number increase control is executed by the ECU, when the value of the spray shape parameter is smaller than the division number reduction determination value, the division number increase control being control to increase the number of partial lift injections in one engine cycle and shorten the injection time of each of the partial lift injections.

* * * * *